Oct. 3, 1967   K. C. CONVERSE   3,344,490
CLAMP FOR BEARING CAGES
Filed April 5, 1965

INVENTOR.
KEITH C. CONVERSE
BY
*John H. Widdowson*
ATTORNEY

United States Patent Office 3,344,490
Patented Oct. 3, 1967

3,344,490
CLAMP FOR BEARING CAGES
Keith C. Converse, Pawnee Rock, Kans. 67567
Filed Apr. 5, 1965, Ser. No. 445,629
10 Claims. (Cl. 24—248)

ABSTRACT OF THE DISCLOSURE

This invention relates to the disassembly of shafts and elements mounted thereon, more particularly to the pulling of bearing assemblies and the like from shafts. Still more particularly, the invention relates to clamps for mounting on bearing cages and other like elements that enable a conventional wheel puller to be operatively secured to the cage or the like. Additionally, this invention relates to clamp members operable to remove bearing assemblies from shafts having a triangular shaped frame with one element pivotally connected to the others and mountable about a bearing assembly in such a manner so as to be readily moved laterally by conventional wheel pullers to remove the bearing assembly without damaging the same.

---

It is a well known and widely used procedure in the removing of pulleys, and the like elements from shafts to pull the pulley, etc. from the shaft with a mechanical device when the pulley or like element is frozen on the shaft, or fits very tightly. The mechanical device most frequently used is a wheel puller. A wheel puller normally has a yoke, a screw in the center of the yoke, and two puller arms attached to the end of the yoke. In use the puller arms have hooks or like projections that are hooked to the pulley, or like elements, and the screw aligned with the shaft in abutting engagement. The screw is then turned to apply a longitudinal force through the puller arms on the element to be removed.

This well known technique works very well when the puller arms can be conveniently attached to the element to be removed. However, very frequently the arms cannot be secured directly to the element to be removed, and a very troublesome disassembly problem is presented. One such example is in the pulling of bearing cages mounted on a flat surface. This arrangement is a very common one in modern machinery. A bearing cage is a bearing support having an annular body portion surrounding and supporting the bearing, and usually a plurality of radially projecting apertured ears adapted to be bolted to the surface. Hooks of a wheel puller cannot be hooked behind the cage because there is normally not sufficient space between the main body of the cage and the mounting surface, and very frequently there is no space.

In such situations the bearing cage is normally cut with a cutting torch, chisel, saw or the like and then removed. This is very undesirable and wasteful because the bearing cage, which could normally be re-used is destroyed. Also, there is always the danger that the shaft itself will be damaged. Still further, the cutting operation is either time consuming and tedious, if done with a chisel or saw, or requires expensive and cumbersome cutting torch equipment and presents a fire hazard.

I have invented a new clamp particularly adapted to be used with a wheel puller, or the like, to free elements from a shaft. The clamp of my invention has a frame with inwardly projecting means on same. The frame has a movable portion and means for securing the movable portion in clamping position. Connecting means are also provided on the frame which are in use adapted to be attached to a pulling means. The clamp in use is adapted to be positioned about a bearing cage, or similar element to be removed, and clamped to same with the inwardly projecting means in abutting relation.

The clamp of my invention solves all of the problems associated with the removal of elements, particularly bearing cage elements, from shafts. The clamp of my invention can be positively secured to irregular shaped elements disposed on shafts. The clamp can then be easily secured to a wheel puller or like pulling tool, and the element conveniently removed. The clamp is particularly adapted to be secured to bearing cages mounted on flat surfaces where the flat surface would ordinarily preclude use of a conventional wheel puller device. The clamp of my invention can efficiently utilize any convenient undercut portion of the element to be removed, however close the undercut may be to the flat surface, to obtain a positive holding engagement. Still further, preferred embodiments of the clamp of my invention have frames of angle iron which are very strong thereby allowing the application of very large pulling forces.

The use of my clamp element eliminates the usual wasteful procedure of cutting and destroying bearing cages and like elements that are hard to remove and which may be positioned close to flat surfaces. The clamp is very simple to use and to operate. The clamp can be used out in the field without expensive welding and/or power equipment. Still further my clamp is relatively inexpensive to produce.

Another object of this invention is to provide a new clamp adapted to be used in combination with a pulling particularly bearing cage elements, from shafts.

Yet another object of this invention is to provide a new clamp for the removal of bearing cages mounted on flat surfaces, which clamp serves as a convenient means to anchor a conventional wheel pulling device.

Another object of this invention is to provide a new clamp for removing bearing cages which is adapted to utilize any convenient undercut portion of the clamp to obtain a secure hold thereto.

Yet another object of this invention is to provide a new clamp adapted to be used in combination with a pulling tool that serves as a simple, safe and convenient means of anchoring the pulling tool to an element to be removed.

Yet another object of this invention is to provide a clamp adapted to be secured to a bearing cage, which clamp has portions which underlie the bearing cage.

Another object of this invention is to provide a clamp construction that is very strong.

Other objects and advantages of the new clamp of my invention will become apparent to those skilled in the art upon reading the disclosure.

Drawings accompany and are a part of this disclosure. These drawings depict preferred specific embodiments of the new clamp of my invention, and it is to be understood that such drawings are not to unduly limit the scope of my invention. In the drawings, FIG. 1 is a front elevational view of a preferred specific embodiment of the clamp of my invention shown clamped to a bearing cage disposed about a shaft.

Figures 1, 2:
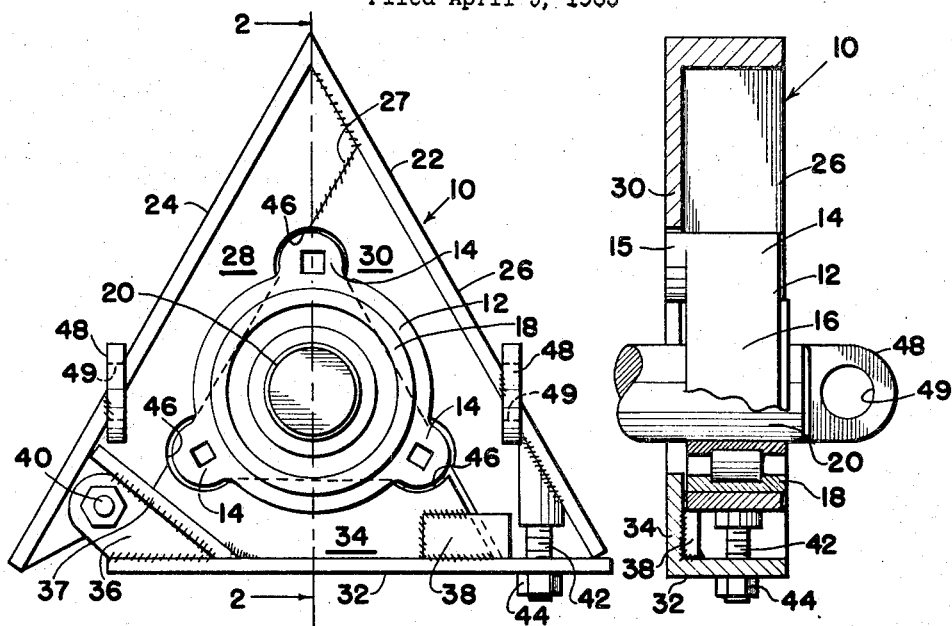
FIGURE 2 is a cross sectional view taken on line 2—2 of FIG. 1.

The following is a discussion and description of the new clamp of my invention made with reference to the drawings wherein the same reference numerals are used to indicate the same or similar parts and/or structure. The discussion and description is of preferred specific embodiments of the clamp of my invention, and it is to be understood that such is not to unduly limit the scope of my invention.

Referring now to the figures of the drawings, there is shown in FIGS. 1 and 2 a preferred specific embodiment 10 of the clamp of my invention. The clamp 10 is shown mounted on a bearing cage 12 having three evenly spaced radially projecting ears 14. This type bearing cage is normally mounted on a flat surface in contact with the rear surfaces 15 of ears 14. As is most clearly shown in FIG. 2 the ears 14 position the main body 16 of the cage 12 a short distance from the flat surface when the cage is in mounted position. The distance between the main body 16 and the mounting surface is relatively small and not sufficient to provide space for the hooks on a conventional wheel puller device. As shown in FIG. 1, the bearing cage 12 supports a bearing 18, which is in turn mounted on a shaft 20. Very frequently the bearing 18 will become "frozen" or firmly secured on the shaft. This situation presents very serious repair and disassembly problems, since the bearing 18 is also firmly secured in bearing cage 12 and cannot normally be removed without removing the assembly from the shaft. The bearing cage 12 and bearing 18 must be ordinarily removed from the shaft as a unit.

The clamp 10 of my invention has a triangular frame 22 having lengths 24 and 26 of angle iron. Lengths 24 and 26 are rigidly joined as by weld 27 at an intersecting angle of approximately 60 degrees. The flanges 28 and 30 of lengths 24 and 22 are directed inwardly and are aligned. A third length 32 of angle iron is also provided, and has an inwardly directed flange 34 positioned in alignment with flanges 28 and 30. An apertured lug 36 is secured, preferably by welding, to one end of length 32, as most clearly shown in FIG. 1. The lug 36 is preferably a short length of angle iron positioned in overlying relationship to flange 34 of length 32. Lug 32 has therefore an upstanding portion 37 which forms a very strong pivotal support for length 32. In order to further strengthen the pivoted length 32 a relatively small piece of strap iron 38 is welded to inwardly directed flange 34 and overlies flange 30 of length 26. A bolt 40 is positioned in apertured lug 36 and extends through an aperture in inwardly directed flange 28. A second bolt 42 is mounted on an end of length 26 with the axis thereof perpendicular to the axis of bolt 40, as shown in FIG. 1. Bolt 42 extends through an aperture in the outwardly extending portion or flange of length 32, and in use is adapted to positively secure pivoted length 32 in closed position when nut 44 is screwed thereon. Three relatively small semi-circular shaped recesses 46 are provided in the inwardly directed flange portions of lengths 24, 26 and 32 at the intersections thereof. These recesses receive the projecting ears 14 of bearing cage 12. As indicated by the dotted lines in FIG. 1, showing the edges of lengths 24, 26 and 32, portions of the flanges 28, 30 and 34 underlie the main body 16 of the bearing cage 12. Two eyelets 48 are secured to the outwardly projecting flanges of lengths 24 and 26. As is clearly shown in FIG. 1, the eyelets 48 are positioned diametrically of the center of the triangular shaped frame 22. This arrangement is provided so that a wheel puller or similar device can be attached to the eyelets 48 by positioning hooks within the apertures 49, and placing the screw in abutting engagement with shaft 20. When the wheel puller is in this position the bearing cage assembly can be easily, safely, and quickly removed.

Figures 3, 4:
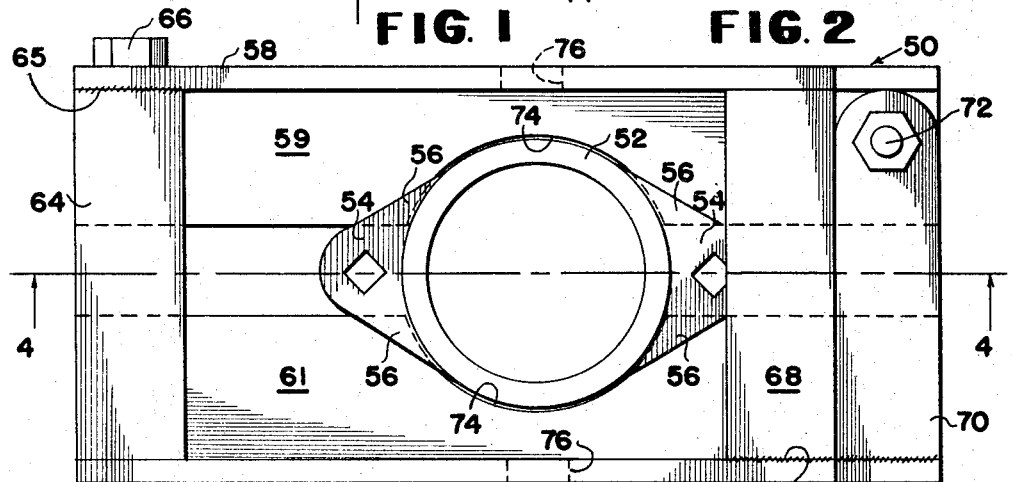
FIG. 3 is a front elevational view of another preferred specific embodiment of a clamp of my invention shown mounted about a bearing cage of different design.
FIG. 4 is a cross sectional view taken on line 4—4 of FIG. 3.
Figure 5:
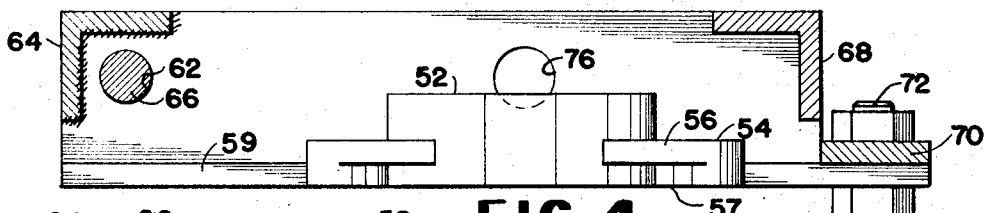
FIG. 5 is an exploded view illustrating the combination of the clamp shown in FIG. 3 and my new adapter element.

In FIGS. 3 to 5 of the drawings, there is shown another preferred specific embodiment 50 of the clamp of my invention. Clamp 50 is particularly adapted to be secured to a bearing cage 52 provided with two spaced diametrically opposed radially projecting ears 54. Bearing cage 52 is provided with fillets 56 joined to ears 54 and the main body of the bearing cage. Fillets 56 are spaced a relatively short distance from the back engaging surface 57 of the bearing cage. The clamp 50 of my invention, which is particularly adapted to remove from a shaft a bearing cage 52 having the configuration shown, has two parallel lengths 58 and 60 of angle iron positioned with the flanges 59 and 61 aligned and inwardly directed. The lengths 58 and 60 are also provided with aligned apertures 62 adjacent one end in the outwardly extending portions or flanges. A length of angle iron 64 is secured by weld 65 to length 58 on the end adjacent the aperture 62. The length 64 is positioned transverse to lengths 58 and 60 and is inverted relative to these lengths, and also spaced from the inwardly directed flanges 59 and 61, as most clearly shown in FIG. 4. A bolt 66 is disposed in aligned apertures 62. A second length 68 of angle iron equal in length to length 64, is secured by weld 69 to length 60. Length 68 is also preferably inverted relative to lengths 58 and 60, and is positioned in spaced relation to flanges 59 and 61. A transverse bar 70 having an aperture at one end is welded at the other end to length 60. Bar 70 is positioned in overlying relation to the inwardly directed flanges of 59 and 61 as most clearly shown in FIG. 4. A bolt 72 is positioned in the aperture in bar 70 and extends through flange 59 to pivotally secure lengths 58 and 60. The nut 67 of bolt 66 secures the two pivoted elements of the clamp in closed position.

Arcuate recesses 74 are provided on the inwardly directed flanges 59 and 61, and collectively define a large circle. The recesses are shaped to encircle the bearing clamp 52. As illustrated in FIG. 3, portions of the inwardly directed flanges 59 and 61, shown in dotted lines, underlie the fillets 56 of bearing cage 52. This arrangement provides a positive abutting inter-action between the bearing cage 52 and clamp 50. Apertures 76 are provided in the outwardly directed flanges of lengths 58 and 60. The apertures 76 are disposed diametrically of the circle defined by the arcuate recesses 74. The apertures, or eyelets, 76 serve as a convenient means for providing a connection means between the clamp 50 and a wheel puller, or the like. In use the clamp 50 is positioned about the bearing cage 52 and clamped to same with the arcuate recesses engaging or encircling the outer surfaces of the clamp with portions of the inwardly directed flanges underlying the fillets 56 of ears 54 of the bearing cage. Any suitable size and shape of recess can be provided in the flanges 59 and 61 to take advantage of any undercut portions that may exist on a particular bearing cage to be removed.

In FIG. 5 is illustrated the combination of my invention of the clamp 50 with an adapter element 80, which will facilitate removal of bearing cages of varying configurations and sizes. The adapter 80 is provided with a U-shaped portion 82 and a handle 84. The U-shaped portion in use is adapted to be inserted between length 64 and the inwardly directly flanges 59 and 61 of clamp 50 in overlying relationship to the flanges and in abutting relation to the bearing cage to be removed. The specific configuration of the U-shaped portion 82 of the adapter can be varied to accommodate the specific shape and size of the bearing cage to be removed. Using the adapter of my invention, the same basic clamp can be used to remove any number of bearing cages with each adapter 80 shaped to conform to the size and shape of each specific bearing cage.

As will be obvious to those skilled in the art, various changes and modifications of the preferred bearing cage clamp of my invention as described can be made or followed without departing from the spirit of the disclosure or the scope of the claims.

I claim:

1. A clamp for removing from a shaft a bearing and bearing cage assembly mounted on a flat surface and having three evenly spaced radially projecting ears in contact with the surface and maintaining the body of the cage in spaced relation to the surface, comprising, a triangular shaped frame having a first length and a second length of angle iron rigidly joined at an intersecting angle of 60 degrees, with the flanges of said lengths of angle iron directed inwardly, a pivotable third length of angle iron positioned with a flange directed inwardly, and having an aperture adjacent one end in the outwardly directed flange, an apertured lug on the other end of said third length overlying the end of the inwardly directed flange of said first length, a first bolt means pivotally securing said lug on said third length to the inwardly directed flange of said first length, a second bolt means positioned perpendicular to the axis of said first bolt and secured to the extending end of said second length and received in said aperture in said third length, a nut on said second bolt, there being three relatively small semi-circular shaped recesses in the inwardly directed flange portions of said lengths at the intersections thereof, two eyelet means secured to the upwardly projecting flanges of said first and said second lengths positioned diametrically of the center of said triangular shaped frame, said clamp constructed to in use be positioned about a bearing cage and clamped to same with said inwardly directed flanges of said lengths underlying in part the body of the bearing cage and with said ears positioned within said relatively small semi-circular recesses.

2. A clamp for removing from a shaft a bearing cage having three spaced radially projecting ears comprising, a triangular shaped frame, said frame having a first length and a second length of angle iron rigidly joined, with the flanges on said first and second lengths directed inwardly, a pivotable third length of angle iron positioned with a flange directed inwardly, means pivotally connecting one end of said third length to the extending end of said first length, a means on said second length for securing said third length in closed position, there being relatively small cut-out portions in the inwardly directed flanges of said lengths of angle iron adjacent the intersections thereof, eyelet means secured to said frame and positioned diametrically of the center of said frame, said clamp constructed in use to be positioned about a bearing cage with portions of the inwardly directed flanges of the first, second and third lengths of angle iron underlying in part said bearing cage.

3. A clamp for a bearing cage having a plurality of radially projecting ears comprising, a triangular shaped frame having first, second, and third lengths of angle iron arranged with the flanges thereof projecting inwardly, means joining the ends of said first and second angle irons, means pivotally securing said third length to the extending end of said first length, means for securing said third length in closed position, eyelet means mounted on said frame, said clamp constructed to in use be positioned about a bearing cage and clamped thereto with portions of the inwardly directed flanges of the first, second and third lengths underlying in part said cage.

4. A clamp for removing from a shaft a bearing and bearing cage assembly mounted on a flat surface and having two spaced diametrically opposed radially projecting ears in contact with the surface comprising, first and second parallel lengths of angle iron, said lengths positioned with the flanges thereof being inwardly directed and aligned, said lengths having aligned apertures adjacent the first ends in the upwardly extending flanges, a third length of angle iron secured to said first length on said first end, said third length positioned transverse and inverted relative to said first length and spaced from said inwardly directed flanges of said first and said second lengths, a bolt disposed in said aligned apertures, a fourth length of angle iron secured to said second length on the opposite second end, said fourth length positioned transverse and inverted relative to said second length and spaced from said inwardly directed flanges of said first and said second lengths, a transverse bar secured at one end to said second length adjacent the second end thereof, said bar having the other opposite end overlying the inwardly directed flange of said first length, there being aligned apertures in said bar and said flange of said first length, a second bolt disposed in said last-mentioned aligned apertures pivotally connecting said first and said second lengths, there being arcuate recesses on the inwardly directed flanges of said first and said second lengths collectively defining substantially a large circle, there being apertures in the upwardly extending flanges of said first and said second lengths disposed diametrically of the circle defined by said arcuate recesses, said clamp constructed in use to be positioned about a bearing cage and clamped to same with said arcuate recesses engaging the outside surface and with portions of said inwardly directed flanges underlying in part the projecting ears of said bearing cage.

5. A clamp for a bearing cage having two spaced diametrically opposed radially projecting ears comprising, first and second lengths of angle iron, said first and said second lengths positioned in parallel relationship with the flanges thereof inwardly directed, a third length of angle iron positioned transverse to said first and said second lengths and secured at one end to said first length adjacent the first end thereof, said third lengths positioned in spaced relation to said inwardly directed flanges on said first and said second lengths, a fourth length of angle bar positioned transverse to said first and said second lengths and secured at one end to said second length on the end opposite third length, a transverse bar secured to said second length, means pivotally securing said bar to said first length, means adjacent the first ends of said first and second lengths for securing same in closed relation, there being arcuate recesses in the inwardly directed flanges of said first and said second lengths collectively defining substantially a circle, eyelet means in said first and said second lengths positioned diametrically of said arcuate recesses, said clamp constructed to in use be positioned about a bearing cage with said arcuate recesses engaging the outside surface with portions of said inwardly directed flange underlying in part the projecting ears of said bearing cage.

6. The clamp of claim 5 in combination with an adapter element to facilitate removal of bearing cages of varying configurations and sizes comprising, a U-shaped portion, a handle attached to said U-shaped portion, said adapter element in use adapted to be inserted between the third length and the inwardly directed flanges of said first and second lengths in overlying relation to said flanges and in abutting relation to the bearing cage to be removed.

7. A clamp for a bearing cage having a plurality of projecting ears comprising, first and second parallel lengths of angle iron positioned with the flanges directed inwardly, means pivotally connecting said first and said second lengths, abutment means positioned between the upwardly directed flanges of said first and said second lengths of angle iron, means for securing said first and said second lengths in closed clamping position, there being recesses in the inwardly directed flanges of said first and said second lengths, eyelet means on said first and said second lengths, said clamp constructed in use to be positioned about a bearing cage with portions of said inwardly directed flanges underlying portions of the bearing cage.

8. The clamp of claim 7 in combination with an adapter element, said adapter element comprising, a bearing cage engaging means having generally parallel portions insertable in overlying relation to said inwardly directed flanges of said first and said second lengths of said clamp.

9. A clamp means for removing a bearing cage comprising, a frame means having first, second and third lengths arranged with connector portions thereof projecting inwardly, means joining the ends of said first and second lengths, means pivotally securing said third length to the other end of said first length, means for securing said third length in a closed position, and said clamp means constructed to in use be positioned about the bearing cage and being clamped thereto with portions of said inwardly directed connector portions of said first, second and third lengths underlying in part the bearing cage for the removal thereof.

10. A clamp means for removing a bearing cage comprising, first and second parallel lengths positioned with connector portions directed inwardly, means pivotally connecting said first and second lengths, abutment means positioned between said first and second lengths, means for securing said first and second lengths in a closed clamped position, there being recesses in the connector portions of said first and second lengths, and said clamp means constructed in use to be positioned about the bearing cage with said inwardly directed connector portions underlying portions of the bearing cage for the removal thereof on outward, lateral movement of said clamp means.

References Cited

UNITED STATES PATENTS

| 906,505 | 12/1908 | Burkholder | 24—249 |
| 1,332,277 | 3/1920 | Weaver | 29—283 X |
| 1,394,963 | 10/1921 | Beach | 20—283 |

FOREIGN PATENTS

| 77,500 | 8/1919 | Austria. |
| 829,129 | 1/1952 | Germany. |

WILLIAM FELDMAN, *Primary Examiner.*

D. A. GRIFFIN, *Assistant Examiner.*